United States Patent [19]

Long

[11] 4,180,270
[45] Dec. 25, 1979

[54] GOLF PUTTING TRAINING APPARATUS

[76] Inventor: Steven K. Long, 17151 Almaden Rd., San Jose, Calif. 95120

[21] Appl. No.: 834,183

[22] Filed: Sep. 19, 1977

[51] Int. Cl.² .......................................... A63B 69/36
[52] U.S. Cl. .................................. 273/186 R; 273/192
[58] Field of Search ......... 73/379; 273/181 H, 183 R, 273/183 A, 184 R, 185 R, 186 R, 186 C, 186 RA; 340/323 R

[56] References Cited

U.S. PATENT DOCUMENTS

| | | | |
|---|---|---|---|
| 2,933,681 | 4/1960 | Crain | 273/186 R X |
| 2,954,232 | 9/1960 | Auer | 273/185 R |
| 3,020,049 | 2/1962 | McNeill | 273/186 RA |
| 3,550,450 | 12/1970 | Griffin | 273/185 R |
| 3,601,408 | 8/1971 | Wright | 73/379 X |
| 3,649,029 | 3/1972 | Worrell | 273/183 A |
| 3,892,414 | 7/1975 | Glasson et al. | 273/181 H |
| 3,894,739 | 7/1975 | Goldstein | 273/186 R |

*Primary Examiner*—Vance Y. Hum
*Attorney, Agent, or Firm*—Claude A. S. Hamrick

[57] ABSTRACT

An electronic golf putting training apparatus including a first and second pivotally retractable sensor extending through the surface thereof flanking an imaginary golf ball for contacting points relative the heel and toe on the face of a golf club swung at the imaginary ball, the first and second sensors for actuating first and second switches substantially on contact with the club and for actuating third and fourth switches, respectively, a preset distance later, and circuitry connected to the first and second switches for actuating an angle right light if the first switch was actuated before the second indicating a ball, if struck, would have traveled right and for actuating an angle left light otherwise. In another embodiment, the apparatus also includes circuitry for measuring the elapse of time between the closure of the switches for calculating and displaying the angle and distance the imaginary ball would have traveled, whether it would have gone into an imaginary cup, and whether the club was accelerating when it actuated the sensors.

4 Claims, 6 Drawing Figures

GOLF PUTTING TRAINING APPARATUS

BACKGROUND OF THE INVENTION

1. Field of the Invention

The present invention relates generally to golf training devices and more particularly to an electronic golf putter training apparatus for computing the parameters of a golf club swing.

2. Description of the Prior Art

In golf, as in many sports, one's game improves with practice. Oftentimes, time for such practice is available when it is inconvenient to travel to a regular golf course and, for this reason, considerable golf is practiced on less than ideal surfaces. Not only do typical office carpets and the like make poor golfing surfaces, but most offices have insufficient space for good practice.

Even on regular golf courses, variations in the surface make concentration on a particular aspect of the game, such as a putting swing, difficult, and considerable time is wasted retrieving golf balls.

In addition, it is difficult to determine whether the golf club was accelerating when it hit the ball, which many people believe is important.

SUMMARY OF THE INVENTION

It is therefore an object of the present invention to provide an apparatus permitting golf putting to be practiced on any surface.

Another object of the present invention is to permit long puts to be practiced in limited quarters without the both of retrieving golf balls.

Still another object of the present invention is to provide a device for accurately measuring the relevant parameters of a golf club swing.

Briefly, the preferred embodiment of the present invention includes a base, a first and a second sensor flanking an imaginary golf ball, the sensors being rotatably mounted to retract into the base when struck by a golf club, a first and a second switch actuated by the first and second sensors respectively shortly after they are struck by the club, third and fourth switches actuated by the first and second sensors respectively after the respective sensor has traveled a preset distance, and circuitry responsive to the time of closure of the first and second switches and operative to power a first or second light dependent upon the direction the imaginary ball would have traveled. An embodiment also includes circuitry responsive to the various switch closures for calculating the time differential between the switch closures and for determining therefrom the angle and distance the imaginary golf ball would have traveled for display on a first indicator, for determining if the imaginary golf ball would have gone in an imaginary cup and if so, for actuating a second indicator, and whether the club was accelerating when it would have hit the imaginary ball.

The ability to practice golf putting at most times and locations is thus a material advantage of the present invention.

Another advantage of the present invention is the ability to separate environmental parameters from those of the golf swing permitting one to concentrate on consistency.

Still another advantage of the present invention is the ability to know the trajectory a golf ball would have taken for a particular swing without having to hit, and then retrieve, a ball.

These and other objects and advantages of the present invention will no doubt become apparent to those skilled in the art after having read the following detailed description of the preferred embodiment which is illustrated in the several figures of the drawing.

DETAILED DESCRIPTION OF THE PREFERRED EMBODIMENT

Figure 1:
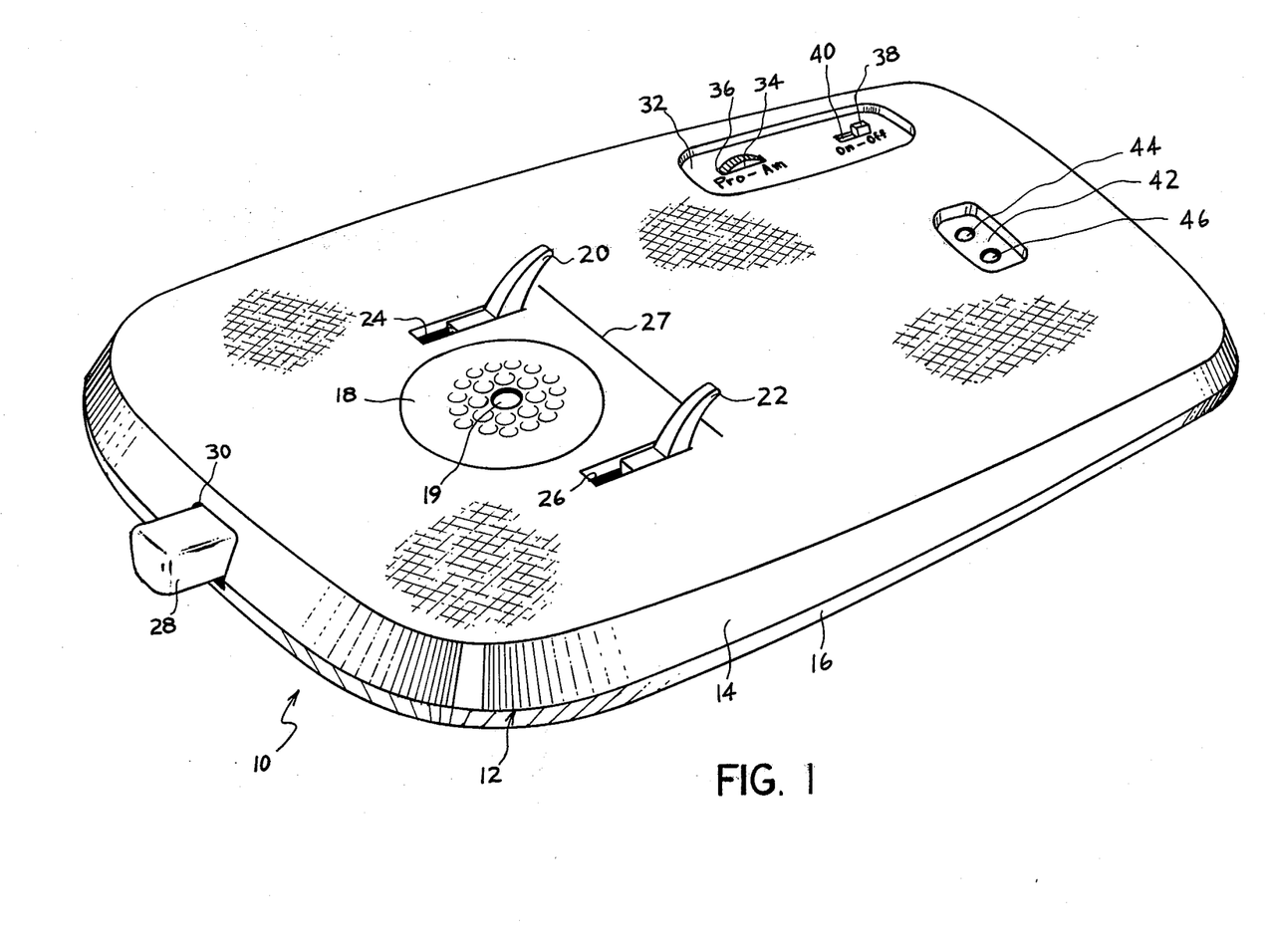
FIG. 1 is a perspective view generally illustrating the various components of an electronic golf putting training apparatus in accordance with the present invention.

A preferred embodiment of an electronic golf putting training apparatus generally designated by the numeral 10 is shown in FIG. 1. The apparatus includes a housing 12 which is thin and generally of rectangular shape. The housing is comprised of the joined upper and lower portions, a portion 14 and a portion 16.

A golf ball resembling decal 18 with a golf ball supporting depression 19 formed therein is located near the front of the housing. The decal is so colored as to aid the user in forming a mental image of an imaginary, three-dimensional, golf ball.

Flanking the imaginary golf ball are first and second golf club contacting sensors 20 and 22. The sensors are positioned as to contact points relative the toe and the heel of an aligned golf club when it would first strike the imaginary golf ball. The sensors are pivotally mounted within the housing, and finger portions thereon extend through slots 24 and 26 so as to permit the sensors to be pivotally driven into the housing by the golf club. A line 27 is provided between the sensors to aid the user in aligning the golf club.

A generally rectangular portion of a reset tongue 28 extends through a slot 30 located in the front of the housing. The tongue is of suitable shape, internally pivotally mounted and spring loaded so that the spring maintains the sensors in the retracted position when they are depressed into the housing until released by a downward pressure exerted on the tongue by the sole of the golf club.

The user adjustable controls are contained within a control depression 32 located near a rear side of the apparatus. A thumb wheel portion of a potentiometer 34 projects through a slot 36 in the depression permitting the user selection of a range of acceptable putting angles and thus a particular level of difficulty. Also located within the depression is a power on/off switch 38 which protrudes through a slot 40.

Within a display depression 42, located near the rear of the apparatus, are two light emitting diodes (LEDs) 44 and 46. The LEDs are operative to provide visual indication of the alignment of the face of the golf club during a swing.

Operationally, switch 38 is set to the on position and the apparatus is placed on the floor or ground. If the sensors 20 and 22 are retained within the housing 12, the apparatus is reset by applying downward pressure on reset tongue 28 using the sole of a golf club.

Next, the golf club is aligned with the imaginary golf ball depicted by decal 18, line 27 and the fingers 20 and 22. If desired, the club face may be actually placed in light contact with the sensors.

A swing, or stroke, is then taken at the imaginary golf ball. If the club face is aligned with the imaginary ball and thus the sensors during the stroke, both LEDs 44 and 46 will light. If the club face is pivoted in excess of a permissible amount as set by thumb wheel potentiometer 34, only one LED will light indicating the direction in which the imaginary golf ball would have traveled. Finally, the apparatus is reset by applying the downward pressure on reset tongue 28 using the sole of the golf club.

Optionally, a real golf ball may be placed in depression 19 to be hit during the stroke. The apparatus will still provide visual indication of an unacceptable pivot of the club face.

Figure 2:
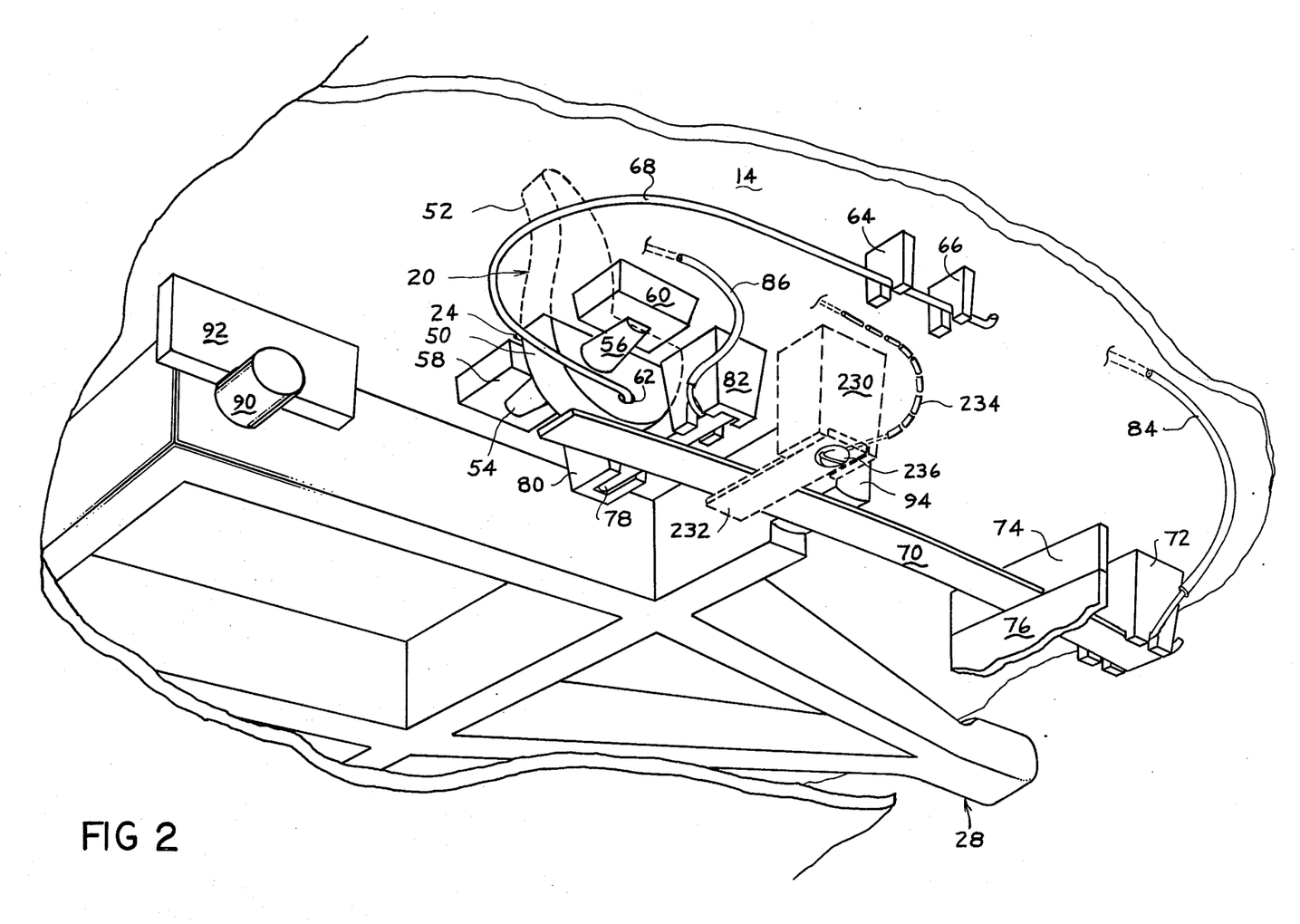
FIG. 2 is a partially broken bottom elevation view generally illustrating the internal mechanical components of the electronic golf putting training apparatus illustrated in FIG. 1.

The internal mounting and operation of sensor 20 and reset tongue are illustrated in FIG. 2. Sensor 20 is shown to have a generally cam- or lobe-shaped lower portion 50, a projecting finger portion 52, and integral shaft portions 54 and 56. The shaft portions 54 and 56 are couched in first and second bushing halves 58 and 60 formed in the lower surface of housing surface 14. The bushing halves are disposed at a height permitting finger portion 52 to project through slot 24. The bushing halves so flank slot 24 as to permit pivoting of sensor 20 to a position in which finger portion 52 is within the housing. Cooperating bushing halves (not shown) are formed in the lower housing portion 16 so as to mate with bushing halves 58 and 60 capturing shaft portions 54 and 56 therebetween.

Disposed between a hole 62 located in a lower portion of sensor 20 and a pair of bosses 64 and 66 is a flexed wire spring 68. The spring is so positioned as to bias the sensor, thereby urging the finger portion 52 through slot 24 to rest against at end thereof in a reset position.

A second metallic leaf-type spring 70 is couched within a boss 72 and captured between a pair of cooperating bosses 74 and 76 formed in the upper and lower housing portions 14 and 16, respectively. The bosses position a distal end of the spring over cam portion 50 and urge it theretoward.

The spring is prevented from contacting or permitted to only lightly contact, cam portion 50 when the sensor is in the reset position by means of a metallic rod 78 couched in first and second bosses 80 and 82 formed in the upper housing portion to straddling slot 24. A pair of cooperating bosses (not shown) are formed in the lower housing portion to mate with bosses 80 and 82.

A first wire 84 is captured between the end of spring 70 and boss 72, and a second wire 86 is captured between rod 78 and bushing 82, forming a first switch.

Rod 78 and cam portion 50 are so disposed that when sensor 20 is pivoted through a small angle from the reset position to a first position, the cam contacts the spring 70 urging it away from the rod and breaking electrical contact between the rod and the spring.

The frictional engagement between the cam portion 50 and spring 70, at some point after sensor 20 has pivoted past the first position, is greater than the biasing force exerted by spring 68, preventing the sensor from being returned by spring 68 to the reset position.

The portion of reset tongue 28 disposed within the housing is shown to be generally A-shaped having a first cylindrical portion 90 and a second cylindrical portion (not shown) projecting from the legs of the tongue. The cylindrical portions are loosely clamped between bushing halves formed in the upper and lower housing portions pivotally mounting the tongue in cantilever fashion. Only the bushing half 92 formed in the upper housing portion 14 for partially supporting cylindrical portion 90, is visible in this figure.

A first arm 94 of the reset tongue is disposed between spring 70 and the upper housing portion 14 at a point located between bosses 80 and 74. In response to downward pressure exerted on tongue 28, the arm deflects spring 70 causing it to disengage sensor 20 and permitting the sensor to be pivoted by spring 68 to the reset position.

The second sensor 22 is similarly disposed within the housing to actuate a second switch, not visible in this figure.

Figure 3:
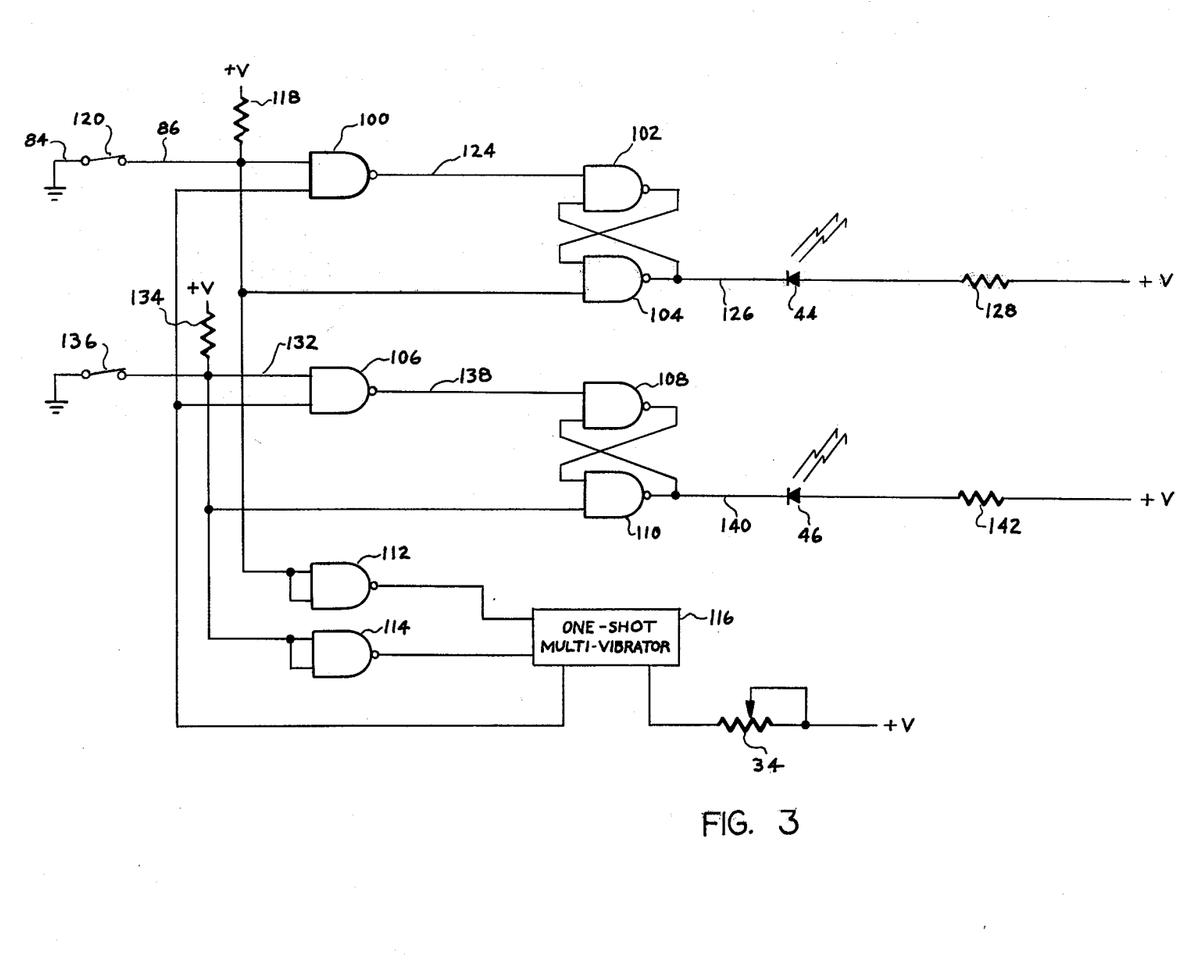
FIG. 3 is a schematic diagram illustrating the electronic components of the electronic golf putting training apparatus illustrated in FIG. 1.

The principal active electronic components of the electronic golf putting training apparatus are shown in FIG. 3 to include eight 2-input NAND gates 100, 102, 104, 106, 108, 110, 112 and 114, and a one-shot multivibrator 116. NAND gate 100 has a first input connected to the positive power supply potential by a resistor 118 and to circuit ground by lines 86 and 84, and a first switch 120 formed by spring 70 and rod 78 (shown in FIG. 2). NAND gate 100 also has a second input connected by a line 122 to the output of multivibrator 116 and an output connected by a line 124 to the first input of NAND gate 102.

NAND gates 102 and 104 are connected in a latch configuration with a first input of gate 102 connected to line 124, an input of gate 104 connected to line 86 and the output of gate 104 connected by the series combination of a line 126 LED 44 and a resistor 128 to the positive power supply potential.

When switch 120 is closed developing a low signal level on line 86, and thus one input to gates 100 and 104, gate 100 develops a high logic level on line 124 setting the latch in a first state in which it generates a high logic level on line 126 preventing operation of LED 44.

When switch 120 opens and resistor 118 develops a high logic level on line 186, the states of gates 100, 102 and 104 remain unchanged unless a high logic line pulse is developed by multivibrator 116 on line 122. Responsive to such a high logic level pulse, gate 100 develops a low logic level signal on line 124 setting the latch to a second state in which it generates a low logic level on line 26 to sink current flowing through LED 44. The latch will remain in this state irrespective of the level of the signal developed on line 122 as long as switch 120 remains open.

NAND gates 106, 108 and 110 operate in a similar fashion. Gate 106 has a first input connected by a line 132 and a resistor 134 to the positive power supply potential and by a switch 136 to circuit ground, a second input connected to the output of multivibrator 116 by line 122 and an output connected by a line 138 to one input of a second latch formed by gates 108 and 110.

The other input to the second latch is connected to line 132, and the output of the latch is connected by the series combination of a line 140, LED 42 and a resistor 142 to the positive power supply potential.

Switch 136 is actuated by sensor 22 in a fashion similar to the actuation of switch 120 by sensor 20. When switch 136 is closed the low signal level developed on line 132 sets the second latch to a first state in which it generates a high logic level on line 140 preventing the operation of LED 42.

If a high logic level pulse is developed by multivibrator 116 on line 122 when switch 136 is open, gate 106 will set the second latch to a second state in which it sinks current on line 140 which operates LED 42, until reset by the closer of switch 136.

Multivibrator 116 is a retriggerable one-shot multivibrator having a first triggering input connected by NAND gate 112 to line 86, a second triggering input connected by NAND gate 114 to line 132, a pulse width setting input connected by potentiometer 34 to the positive power supply potential and an output connected to line 122.

The multivibrator is reset by the simultaneous closers of switches 120 and 136. Responsive to the first switch opening, the multivibrator generates a high logic level pulse on line 122 having a width which is set by potentiometer 34. The second switch opening does not trigger the multivibrator.

With additional reference to FIG. 1, the apparatus is reset by actuation of reset tongue 28 with releases sensors 20 and 22, causing the closure of switches 120 and 136. The closure of switches 120 and 136 resets the latches generating a high logic level on line 126 and line 140 and prevents the operation of LEDs 42 and 44. The switch closures also reset multivibrator 116.

When the user swings a club at the imaginary ball, his club will actuate sensors 20 and 22. Dependent upon the angle of the club face, either sensor 20 or 22 will be struck first. For discussion, assume the club contacts sensor 20 before sensor 22 causing switch 120 to open first. When switch 120 opens, multivibrator 116 will generate on line 126 a high logic level pulse having a width set by potentiometer 34. This pulse causes gate 100 to set the latch comprised of gates 102 and 104 to a first state in which it sinks current from line 126 causing the operation of LED 44.

Next, sensor 22 will be struck by the club face actuating switch 136. Should this occur during the pulse generated by multivibrator 116, gate 106 will set the second latch to the second state generating LED 42 and thus indicating that the imaginary golf ball would have traveled straight within the tolerance set by potentiometer 34.

Should switch 136 open following the pulse generated by multivibrator 116 on line 122, the second latch will not be set to the second state and LED 42 will not light, indicating that the imaginary golf ball was struck too far to the left to be within the acceptable angular range as set by the potentiometer.

Figure 4:
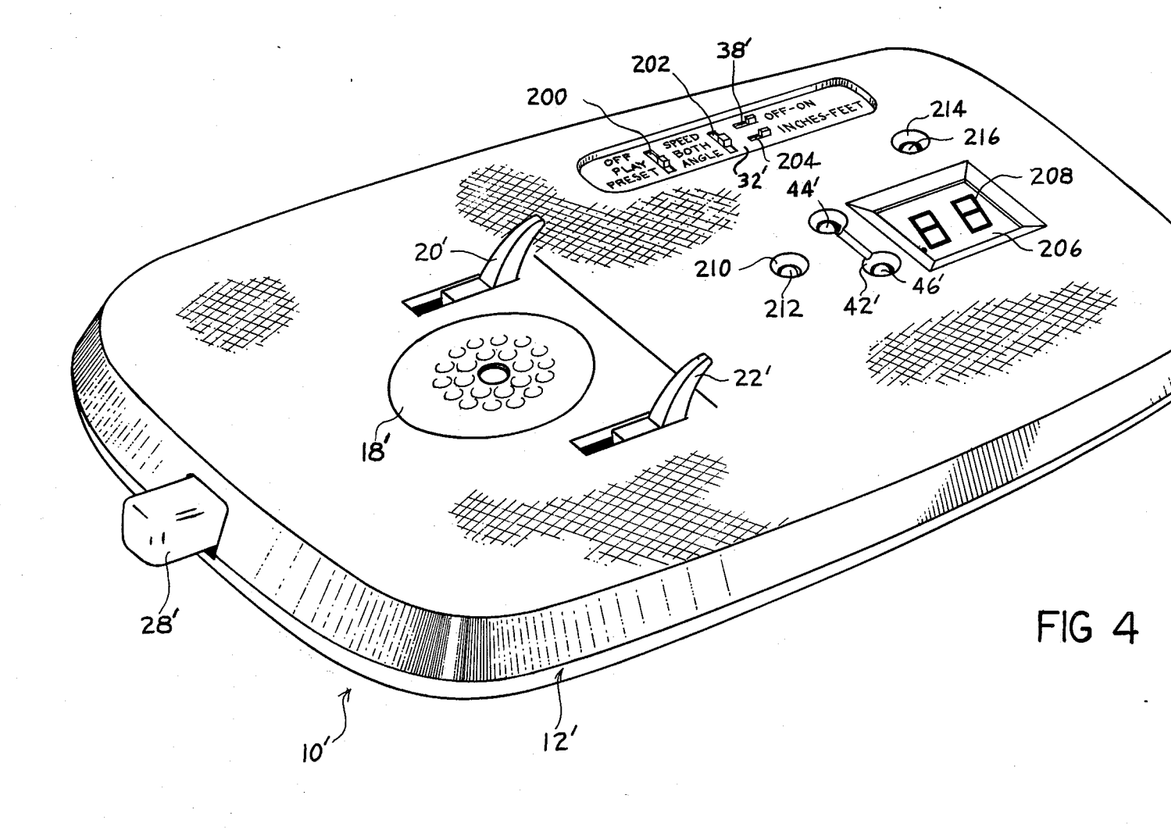
FIG. 4 is a perspective view generally illustrating the variosu component parts of an alternative embodiment of an electronic golf putting training apparatus in accordance with the present invention.

Turning now to FIG. 4, an alternative embodiment of the electronic golf putting training apparatus 10' is shown. The apparatus includes a housing 12', a golf ball resembling decal 18', two sensors 20' and 22', a reset tongue 28', a user adjustable control depression 32' and a first display depression 42' having LEDs 44' and 46', all similar to those discussed in connection with FIG. 1.

Within control depression 32' are located a cup calibration switch 200, a mode switch 202, the power on/off switch 38' and a distance switch 204.

In this embodiment a second display depression 206 is provided for a seven-segment display 208, a third display depression 210 for a LED 212, and a fourth display depression 214 for still another LED 216.

Operation of this embodiment is similar to that discussed in connection with FIG. 1. With the cup calibration switch 200 in the off position and the power on/off switch in the on position, the user first resets the apparatus by depressing reset tongue 28'. Next, a golf club is aligned with sensors 20' and 22', and the imaginary golf ball depicted at 18'. When ready, the user then swings at the imaginary golf ball and thereby actuates sensors 20' and 22'.

The apparatus then displays, using LEDs 44' and 46', the direction in which the imaginary golf ball would have gone. Also, dependent upon the setting of mode switch 202, the apparatus will display on seven-segment display 208 the angle from straight in which the imaginary golf ball would have traveled, the distance the ball would have traveled, or alternately flash both.

Finally, the apparatus will cause LED 216 to light if the club was not accelerating as it contacted the sensors.

Switch 204 permits the distance to be displayed in inches or ½-foot increments.

The user may also practice using an imaginary cup actuated by cup calibration switch 200. First, switch 200 is set in a preset position and the user takes a swing as described above. Display 208 will then display the distance the imaginary ball would have traveled and the apparatus stores this distance.

Next, the user switches switch 200 to a play position. Thereafter, as the user swings, if the imaginary ball would have gone in excess of the preset distance but within a suitable range of the preset distance and within a suitable range of angles, LED 212 will also light, indicating that the imaginary ball would have gone in the imaginary cup.

Two additional switches are included in this embodiment, one being tipped by each of sensors 20' and 22'. Each switch is so disposed as to be tripped by its respective sensor after it has rotated a preset distance beyond that necessary to open the first switch contact.

Returning again to FIG. 2, the additional switch associated with sensor 20' is shown in dashed representation. A boss 230 is formed in the upper housing portion 14 between arm 94 and boss 82. A flexible metal contact 232 and a wire 234 are clamped by a screw 236 to boss 230. The contact is so disposed below spring 70 as to prevent electrical connection therebetween until sensor 20 has rotated a reset distance beyond that required to break the electrical connection between rod 78 and spring 70. At this point, the camming action of sensor 20 atainst spring 70 presses the spring into electrical connection with contact 232.

The additional switch associated with sensor 22 (not shown) operates in a similar fashion.

Figure 5:
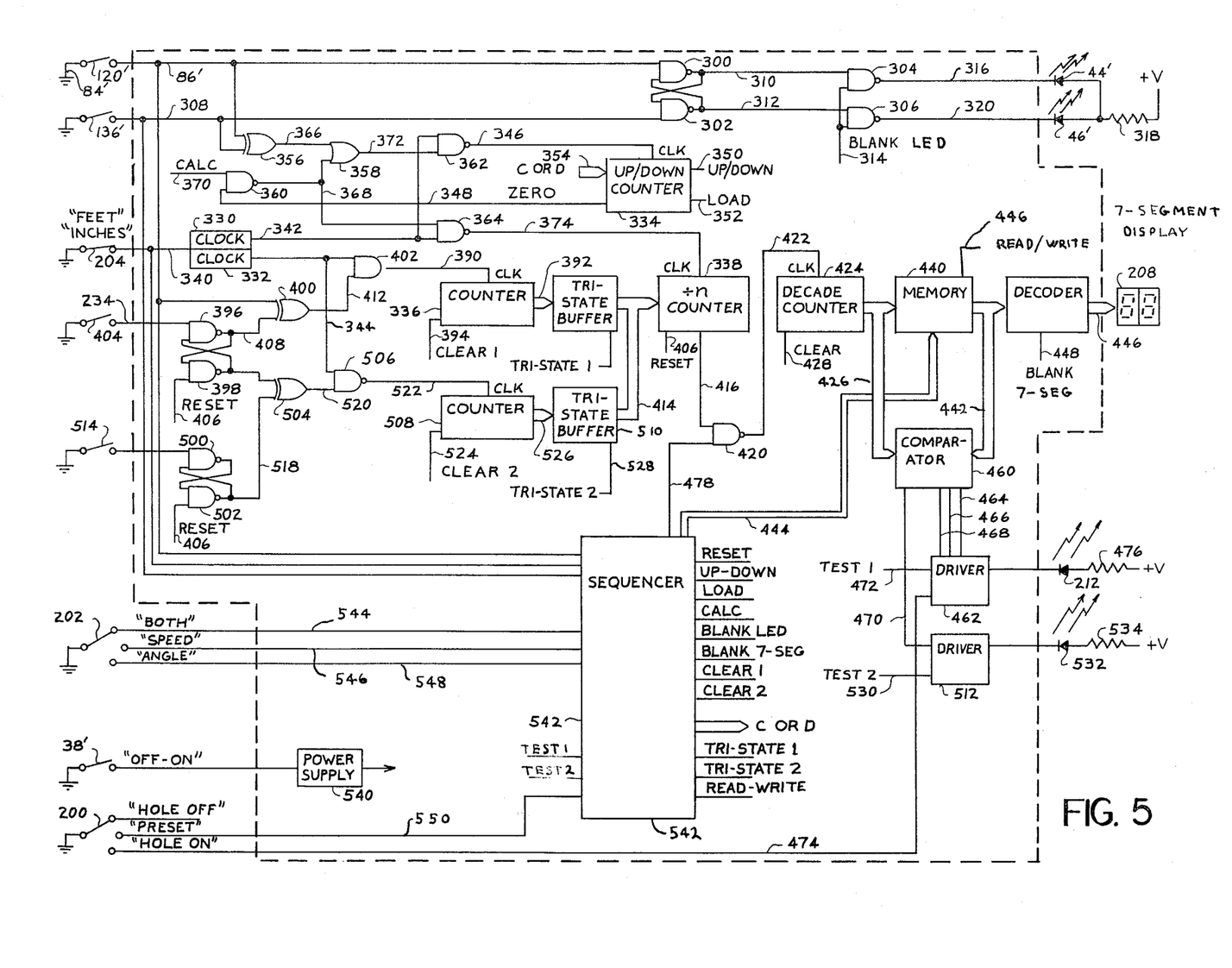
FIG. 5 is a partial block and schematic diagram illustrating the principal electronic components of the golf putting training apparatus illustrated in FIG. 4.

The principal active components for actuating the golf club face direction indicating LEDs 44' and 46' are shown in FIG. 5 to include four NAND gates 300, 302, 304 and 306. Gates 300 and 302 are connected in a latch configuration. A first latch input to gate 300 is connected by the series combination of line 86', switch 120' and line 84' to circuit ground, and a second latch input to gate 302 is connected by a line 308 and switch 136' to circuit ground.

The outputs of gates 300 and 302 are connected to the first inputs of gates 304 and 306 by lines 310 and 312, respectively, and the second inputs are connected to a LED blanking line 314. The output of gate 304 is connected by the series combination of a line 316, LED 44' and a resistor 318 to the positive power supply potential, and the output of gate 306 is connected by a line 320, LED 46' and resistor 318 to the positive power supply potential.

When the apparatus is reset, switches 120' and 136' are closed, developing low signal levels on lines 86' and 308. In response, gates 300 and 302 develop high logic level signals on lines 310 and 312. At this time, a low signal level is developed on line 314, causing gates 304 and 306 to generate high logic level signals on lines 316 and 320, thereby preventing the operation of LEDs 44' and 46'.

When a swing is taken at the imaginary golf ball, the club face will contact either sensor 20' or sensor 22' (shown in FIG. 4) slightly before the other one. Assuming for discussion sensor 20 first contacts the club face. In this case, switch 120' will open at least an instant prior to switch 136'. The high signal level developed on line 86' causes gate 300 to generate a low logic level on line 310, which prevents the triggering of gate 302 by switch 136'.

Next, when a high signal level is developed on line 314, gate 304 will develop a high logic level signal on line 316, preventing the operation of LED 44'. At this time, gate 306 will develop a low logic level signal on line 320 sinking current through LED 46' and causing it to light. In a similar fashion, if switch 136 opens prior to switch 120', the latch will be set in a state causing LED 44' to light rather than LED 46'.

The principal active components for determining the angle and distance include first and second clocks 330 and 332, an up/down counter 334, a counter 336 and a divide-by-n counter 338. Clock 330 has an input connected by a line 340 to the distance switch 204 for selecting a first or a second clocking rate. The clock develops clocking pulses at the first or second rate on a line 342.

The clocking pulses developed by clock 330 are divided by clock 332 to develop on a line 344 clocking pulses at a lower rate, but one which is proportional to that developed by clock 330 on line 342.

Counter 334 has an input connected to a line 346 for receiving the clocking pulses and develops a signal at an output, which is connected to a line 348, when the sum in the counter is equal to zero. The counter also has various control inputs including a count up or down input connected to a line 350, a load preset input connected to a line 352 and inputs for receiving a preset count which are connected to a bus 354.

Clocking pulses developed on line 342 are coupled to the clocking input of counter 334 by a series of gates including an EXCLUSIVE-OR gate 356, an OR gate 358 and three NAND gates 360, 362 and 364. Gate 356 has a first input connected to line 86', a second input connected to line 308 and an output connected by a line 366 to a first input of gate 358.

The second input of gate 358 is connected by a line 368 to the output of gate 360 which has a first input connected to a line 370 for receiving a calculated control signal and a second input connected by line 348 to the zero output of counter 334.

The output of gate 358 is connected by a line 372 to a first input of gate 362 which has a second input connected to clock 330 by line 342 and an output connected to the clock input of counter 334.

Gate 364 has a first input connected to line 342, a second input connected to line 368 and develops an output on a line 374.

As discussed previously, either switch 120' or 136' will open first. During the period when only one of the switches is open, gate 356 will develop a high logic level signal on line 366. In response to this high logic level signal, gate 358 will develop a high logic level signal on line 372 causing gate 362 to couple clocking pulses developed on line 342 to the clocking input of counter 334. It will thus be seen that the magnitude of the count accumulated in counter 334 is proportional to the period of time which has expired between the opening of the first and second of switches 120' and 136'.

When a nonzero count is stored in counter 334 and appropriate signals are developed on calculate line 370 and up/down control line 350, gate 360 will develop a high logic level signal on line 368. In response, gate 358 will generate a high logic level signal on line 372, causing gate 362 to couple clocking pulses developed on line 342 to the clocking input of counter 334. The counter will then count down to zero at which time the signal developed by counter 334 on zero line 348 will inhibit further counting.

During the time that gate 360 develops a high logic level on line 368, causing counter 334 to count down, gate 364 will couple the closing pulses developed on line 342 to line 372. There is thus developed on line 374 a number of clocking pulses equal to that developed on line 346 which is equal to the sum from which counter 334 is counted down.

Counter 336 has a clock input connected to a line 390 and develops a sum on a bus 392. The counter also has an input connected to a first clear control line 394.

Clocking pulses developed by counter 332 on line 344 are coupled to the clocking input of counter 336 by a series of gates including two NAND gates 396 and 398, an EXCLUSIVE-OR gate 400 and a NAND gate 402. Gates 396 and 398 are connected in a latch configuration and have a first input connected by line 234 to switch 404 which is comprised of spring 70 and contact 232 (shown in FIG. 2). The latch also has a second input connected to a reset line 406, a first output connected to an input of gate 400 by a line 408 and a second output connected to a line 410.

Gate 400 has a first input connected to line 408, a second input connected to line 308 and an output connected to a first input of gate 402 by a line 412.

The second input of gate 402 is connected to line 344, and the output of the gate is connected to the clock input of counter 336.

Between the time when the golf club has caused sensor 20' to open switch 136 and the time when it causes switch 404 to close, a high signal level is developed on line 308 and a low signal level on line 408. These signals cause gate 400 to generate a high logic level signal on line 412. In response, gate 402 will couple clocking pulses developed by counter 332 on line 344 to the clocking input of counter 336 causing counter 336 to generate a sum signal proportional to this elapse of time.

Counter 338 has a clocking input connected to line 374, a preset input connected to a bus 414 for receiving the sum signal developed by counter 336 and develops a number of output pulses proportional to the quotient on a line 416. The counter also has a reset input connected to line 406.

The quotient signal is coupled by a NAND gate 420 and a line 422 to a clock input of a decade counter 424 which develops a sum output on a bus 426. Counter 424 also has a clear input connected to a line 428.

Operationally, the count stored in counter 336, which is proportional to the elapse of time between the closure of switch 136' and the opening of switch 404, is coupled to the preset input counter 338.

Next, the sum developed in counter 334, which is proportional to the period of time which elapsed between the opening of switches 120' and 136', is counted down. With each clock pulse decrementing counter 334, a similar pulse is coupled to the clock input of counter 338. Counter 338 thus develops on line 416 a number of clock pulses proportional to the quotient and thus the angle of head rotation of the golf club. The quotient pulses are counted in decade representation by counter 424.

Next, a first constant signal developed on bus 354 is loaded into counter 334. Then the constant is divided in counter 338 by the sum in counter 336. Counter 338 thus generates a number of pulses to be counted by counter 424 which is proportional to the velocity of the golf club head.

Next, the counter 338 divides the count in counter 334 by the count in counter 336 to develop a quotient count in counter 424 proportional to the acceptable angle for that distance. This count is then stored in a third memory location in memory 440.

Next, the count in counter 336 is processed as was discussed above to develop a distance count in counter 424. This count is stored in a fourth memory location. Finally two or twelve pulses, dependent upon the setting of switch 204, are developed on line 478 to be added to the count in counter 424. The resultant sum is stored in a fifth location in memory 440.

If switch 200 is then set to the hole-on position, the angle count developed in counter 424 will be compared with the one stored in the third location of memory 440 by comparator 460. If the new angle is less than the stored angle, comparator 460 will develop and latch a high logic level signal on line 464.

Next, when the distance count is developed in counter 424, comparator 460 will compare it with the two counts stored in the fourth and fifth locations of memory 440. If the count in counter 424 is within that range, comparator 460 will develop high logic level signals on lines 466 and 468 causing driver 462 to actuate LED 212.

The added components for determining wither the club accelerated through the ball include two NAND gates 500 and 502, an exclusive OR gate 504, a NAND gate 506, a counter 508, a tri-state buffer 510 and a driver 512. Gates 500 and 502 are connected in a latch configuration with a first input connected to a switch 514, a second input connected to reset line 406 and an output connected by a line 518 to the first input of gate 504, which has a second input connected to line 410.

Gate 506 has a first input connected to the output of gate 504 by a line 520, a second input connected to line 344 and an output connected by a line 522 to the clocking input of counter 508.

Counter 508 additionally has a clearing input connected to a line 524, and outputs connected to bus 414 by a bus 426 and tri-state buffer 510. The buffer is controlled by a signal developed on a line 528.

Driver 512 has a first input connected to line 470, a control input connected to a line 530 and an output connected by an LED 532 and a resistor 534 to the positive power supply potential.

During the time between the openings of switch 404 and switch 514, gate 504 develops a high logic level signal on line 520 causing gate 506 to couple clocking pulses from clock 332 to counter 508.

The count stored in counter 508 is processed in a fashion similar to the one stored in counter 336 to develop a distance count in counter 424 which is compared in comparator 460 with the first distance count. Should the second distance count be lower than the first, comparator 460 generates a signal on line 470 causing driver 512 to actuate LED 532.

The apparatus also includes a power supply 540 controlled by switch 38' and a sequencer 542. The sequencer has inputs connected to lines 86' and 308 for sensing a reset condition of the apparatus. Other inputs of the sequencer are connected to line 340, three lines of switch 202, 544, 546 and 548, and by a line 550 to the preset position of switch 200.

In the preferred embodiment, the sequencer includes a clock driving a counter which is reset by the signals on lines 86' and 308. The counter drives a data distributor which develops the output signals.

Figure 6:
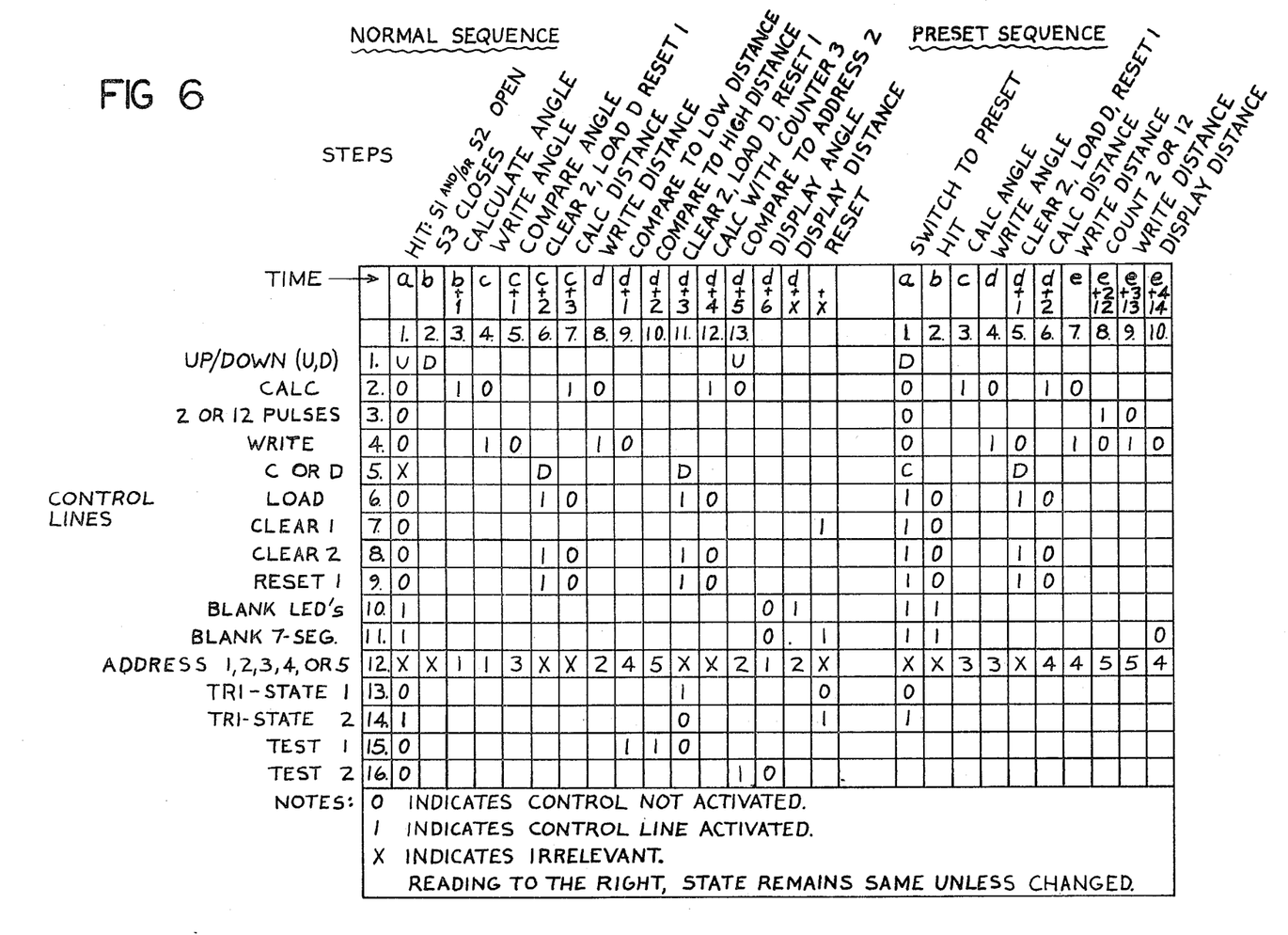
FIG. 6 is a table illustrating the states of the various outputs of the sequencer illustrated in FIG. 5.

A timing diagram illustrating the levels of the outputs of sequencer 542 are shown in FIG. 6.

A memory 440 has inputs connected to counter 424 by bus 426 and outputs connected to a bus 442. The memory also has address inputs connected to a bus 444 and a read/write control input connected to a line 446.

First the memory receives from counter 424 the angle count and then the distance count which it stores in first and second locations in memory. Next, dependent upon the address signals generated on bus 444, the memory retrieves and outputs on bus 442 the angle count, the distance count, or alternates them.

A seven-segment decoder has inputs connected on bus 442 for receiving the ocunt signals and generates on a bus 446 seven-segment display dirivng signals to drive display 208. The driver also has a display blanking input connected to a line 448.

The principal additional components for generating the imaginary cup include a comparator 460 and a driver 462. The comparator has inputs connected to buses 426 and 442 for receiving the two numbers to be compared and developed signals on four lines 464, 466, 468 and 470 indicative of the magnitude of the signals being compared.

Driver 462 has five inputs including lines 464, 466, 468 a line 472 and a line 474. The driver has an output connected by LED 212 and a resistor 476 to the positive power supply potential.

At a time coincident with a signal developed on line 472, if the signal level on line 464, 466, 468 are all high and the signal level on line 474 is low, driver 462 will develop a low signal level output causing illumination of LED 212.

Operationally, when switch 200 is in the preset position and a count is developed in counter 336 proportional to the distance, a second constant is developed on bus 354 and loaded into counter 334.

Although the above description was with reference to particular embodiment, it is understood that alternative embodiments may be employed. For example, a rough approximation of both the angle and distance calculations may be performed in one counter such as counter 334 of FIG. 5. The output of the counter may also be used to directly drive a display. Specifically, as shown, counter 334 will develop a counte proportional to the angle of the club face.

By transferring the input which is connected to gate 356 from switch 136' to switch 404, and causing counter 334 to count down from a preset constant, a count roughly proportional to the distance the imaginary golf ball would have traveled will be obtained. The count may again be used to directly drive a display.

In addition, the sensor may be replaced with electro-optical switches which are disposed at suitable positions to generate the switch signals when the golf club passes thereover.

It is contemplated that other alterantions and modifications of the present invention will no doubt become apparent to those skilled in the art. It is therefore intended that the following claims be interpreted to cover all such alterations and modifications as fall within the true spirit and scope of the invention.

What is claimed is:

1. A golf putting training apparatus comprising:
a housing;
a first detector for developing a club toe detect signal when the club crosses a first point located on a first side of an intended line of club travel over said housing and including first switch means mounted within said housing and having a first pivotable actuating member extending through a first opening in said housing, said first actuating member being engageable be said club and movable between a first switch position and a second switch position;
a second detector for developing a club heel detect signal when the club crosses a second point located on the other side of said intended line of travel, and including second switch means mounted within said housing and having a second pivotable actuating member extending through a second opening in said housing, said second actuating member being engageable by said club and movable between a first switch position and a second switch position, said first and second points being disposed along a line transverse to said intended line of club travel;
a third detector for developing a third club detect signal where the club crosses a third point positioned so as to be crossed by the club after it has crossed said first and seocond points;
reset means disposed within said housing and having an actuating projection extending through a third opening in said housing for engagement by the foot of a user, said actuating projection being movable between a rest position and a reset position and operable to move said first and second actuating members from said second switch positions to said first switch positions when said actuating projection is moved from said rest position to said reset position;
circuit means connected to said first and second detectors for receiving said first and second club detect signals and for generating a first display driving signal which is commensurate with the difference between a predetermined characteristic of said first club detect signal and a corresponding characteristic of said second club detect signal, said circuit means being further connected to said third detector for receiving said third club detect signal and for generating a second display driving signal which is proportional to the time delay between the passing of the club head over one of said first and second points and said third point;
display means connected to said circuit means for receiving said first display driving signal and for providing a numerical indication of the degree of misalignment of the club head relative to said transverse line as it crosses thereover, said display means further receiving said second display driving signal and providing in response thereto an indication of the club head speed as it crosses said transverse line.

2. A golf putting training apparatus as recited in claim 1 wherein said circuit means further generates a third display driving signal, said first display driving signal being generated when the club crosses said first point before said second point and said third display driving signal being generated when the club crosses said second point before said first point, and wherein said display includes:
a first indicator for receiving said first display driving signal and for indicating if the club was rotationally misaligned in a first direction; and
a second indicator for receiving said third display driving signal and for indicating if the club was rotationally misaligned in the other direction.

3. A golf putting training apparatus as recited in claim 2 wherein said circuit means further generates both of said first and third display driving signals when the club crosses said first and second points within a preset time period.

4. A golf putting training apparatus as recited in claim 1 wherein said circuit means includes:
means for generating a series of clocking pulses; and
counter means connected to said clocking pulse generating means responsive to said first and second detect signals and operative to generate said first display driving signal, whereby said first display driving signal is proportional to the number of said clocking pulses which occur between the occurance of said first and second detect signals.

* * * * *